(12) United States Patent
Cleveland

(10) Patent No.: US 8,973,275 B1
(45) Date of Patent: Mar. 10, 2015

(54) PORTABLE SAW, IN PARTICULAR A PORTABLE BAND SAW

(71) Applicant: David E. Cleveland, Pearlington, MS (US)

(72) Inventor: David E. Cleveland, Pearlington, MS (US)

( * ) Notice: Subject to any disclaimer, the term of this patent is extended or adjusted under 35 U.S.C. 154(b) by 0 days.

(21) Appl. No.: 13/894,993

(22) Filed: May 15, 2013

(51) Int. Cl.
*B27B 13/08* (2006.01)
*B23D 53/12* (2006.01)

(52) U.S. Cl.
CPC ..................................... *B23D 53/12* (2013.01)
USPC ............................................................ 30/380

(58) Field of Classification Search
CPC ........ B27B 13/02; B27B 13/08; B27B 13/10; B23D 55/08; B23D 55/06; B23D 55/082; D23D 53/12
USPC .................................................. 30/380, 122
See application file for complete search history.

(56) References Cited

U.S. PATENT DOCUMENTS

| | | | | |
|---|---|---|---|---|
| 1,755,067 A * | 4/1930 | Kuenne | ........................... | 30/381 |
| 3,621,894 A * | 11/1971 | Niksich | ........................... | 30/380 |
| 4,001,937 A * | 1/1977 | Stelljes et al. | .................. | 30/380 |
| 4,413,414 A * | 11/1983 | Strzalka | ........................... | 30/380 |
| 4,953,295 A * | 9/1990 | Barradas et al. | ................ | 30/380 |
| 8,677,633 B2 * | 3/2014 | Holly et al. | ..................... | 30/380 |
| 8,770,072 B2 * | 7/2014 | McIntosh | ........................... | 83/13 |
| 2002/0157264 A1* | 10/2002 | Falberg | ........................... | 30/380 |
| 2011/0119935 A1* | 5/2011 | Elger et al. | ...................... | 30/380 |

\* cited by examiner

*Primary Examiner* — Hwei C Payer
(74) *Attorney, Agent, or Firm* — Shlesinger, Arkwright & Garvey LLP

(57) ABSTRACT

Portable saw includes a housing and a continuous saw blade provided in the housing. A throat in housing is shaped and sized for exposing a portion of a continuous saw blade so saw blade contacts and cuts an object brought into contact with the saw blade, in use. A power unit detachably attached to housing includes a drive for driving the saw blade. A side handle is provided on housing, and an end handle is detachably attached to the housing. The housing, saw blade, power unit, and handle are sized so user can carry and use the portable saw. Housing includes two halves detachably attached to each other so the user can take them off and replace them with a different housing having different handles and a different throat to provide a different throat having a different size and shape than the throat of the removed housing.

9 Claims, 3 Drawing Sheets

PORTABLE SAW, IN PARTICULAR A PORTABLE BAND SAW

FIELD OF THE INVENTION

The invention relates to a saw. More specifically, the invention relates to a portable saw. Even more particularly, the invention relates to a portable band saw.

BACKGROUND OF THE INVENTION

Portable saws, such as hand saws and power saws, including so-called chainsaws are known.

Stationary saws, including so-called table saws, are known. Table saws are often termed band saws when they have a saw blade which is a continuous or endless toothed saw blade. Table saws also exist that have a saw blade which is a straight saw blade segment which is reciprocated.

There is a need for a portable saw which incorporates the benefits of a band saw with a continuous saw blade and a portable saw.

OBJECTS AND SUMMARY OF THE INVENTION

An object of the invention is to overcome the drawbacks of the prior art.

Another object of the invention is to provide a portable saw which includes the advantages of portability as well as a continuous band saw blade.

A further object of the invention is to provide a portable saw which may be used by both left handed and right handed users.

A further object of the invention is to provide a portable saw having a portable power unit, such as an electric motor or an internal combustion (IC) engine.

A still further object of the invention is to provide a portable saw which may be used at various angles.

Yet another object of the invention is to provide a portable saw which includes variable throat widths, so as to accommodate objects of various sizes to be cut by the saw blade.

Another object of the invention is to provide a portable saw with parts which can be detached and relocated on the saw to accommodate different users, as well as to be readily changed to suit different uses by the same user.

Another object of the invention is to provide a portable saw in which components are readily interchangeable between different housings and models, such as changing a motor or a handle or both to suit a user's preference, such as left handed and right handed users.

Another object of the invention is to provide a portable saw in which two housings are provided, one housing including a cutting area at an end of the housing away from the motor, and another housing having an opening or throat in which the cutting blade is exposed and which is on a side adjacent the motor on the portable saw, so that the user may readily switch between a first throat and a second larger throat to accommodate larger pieces of material to be cut.

It is a further object of the invention to provide a portable saw having a housing which can be easily changed so as to provide for switching between a relatively long narrow throat and a relatively short wide throat depending on the needs of the user.

It is a further object of the invention to provide a portable band saw including a continuous cutting blade that has a powered drive wheel for the cutting blade and two unpowered guide wheels which are spaced apart from each other so as to form a triangle defined by the driven wheel and the two spaced apart guide wheels, the triangular configuration being selected so that by using the three wheels in a fixed position relative to each other, the open cutting area or throat can be readily changed from a first width and depth to a second width and depth, so as to increase the versatility of the portable band saw.

In sum, the invention includes a portable saw including a housing having a first face and a second face, and a continuous saw blade provided substantially inside the housing. A throat is provided in the housing, the throat being configured and sized for exposing a portion of the continuous saw blade so that the saw blade can contact and cut an object brought into contact with the saw blade. There is a power unit provided on the first face of housing, the power unit is detachably attached to the first face, and the power unit includes a drive for driving the continuous saw blade in a first direction for cutting an object brought into contact with the continuous saw blade. Also, a first guide and a second guide are provided for guiding the continuous saw blade, and the second guide is spaced apart from the first guide. A side handle is provided on the housing at a distance from the power unit, the side handle being configured for being held by a user at a desired angle. An end handle is provided on the first face of the housing adjacent the power unit, and the end handle is detachably attached to the housing. The housing, the continuous saw blade, the power unit, and the handle are sized and configured so that a user may support, carry, and use the portable saw for cutting an object brought into contact with the continuous saw blade.

The invention further includes a portable saw in which the housing includes a top housing and a bottom housing, and the bottom housing is detachably attached to the top housing.

The invention further includes a portable saw in which the drive, the first guide, the second guide, and the continuous saw blade are configured to remain in place relative to each other when the top housing is detachably attached.

The invention further includes a portable saw in which a further housing is provided, the further housing having a side handle provided on the housing on a left side at a distance from the power unit, and the further housing having a further throat provided on the further housing, the further throat having a different configuration than the configuration of the throat provided on the housing.

The invention further includes a portable saw in which the further throat is provided on the right side of the further housing.

The invention further includes a portable saw in which the first guide, the second guide, and the drive are spaced apart from each other and define a triangle, and a first distance between the first guide and the second guide differs from a second distance between the first guide and the drive.

The invention further includes a portable saw in which the throat provided in the housing is provided between the first guide and the second guide.

The invention further includes a portable saw in which the throat provided in the housing is provided between the first guide and the drive.

Relative terms such as left, right, up, and down are for convenience only and are not intended to be limiting.

DETAILED DESCRIPTION OF THE INVENTION

Figure 1:
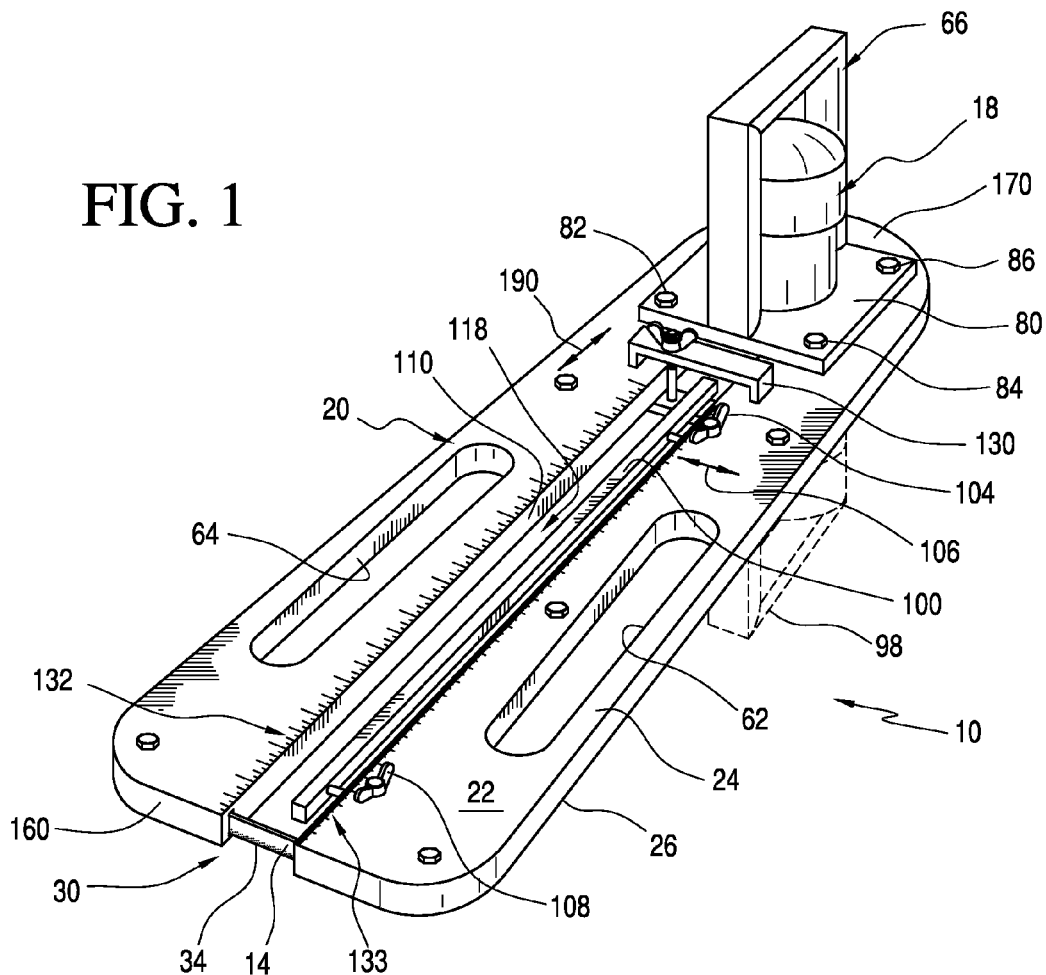
FIG. 1 is a top perspective view of a preferred embodiment of a portable saw according to the invention.
Figure 2:
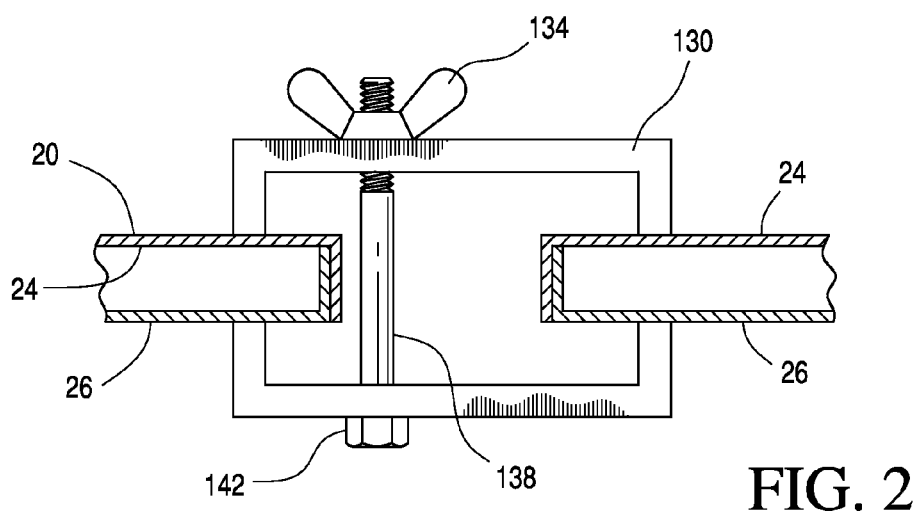
FIG. 2 is a schematic side view of a depth gauge according to the invention.
Figure 3:
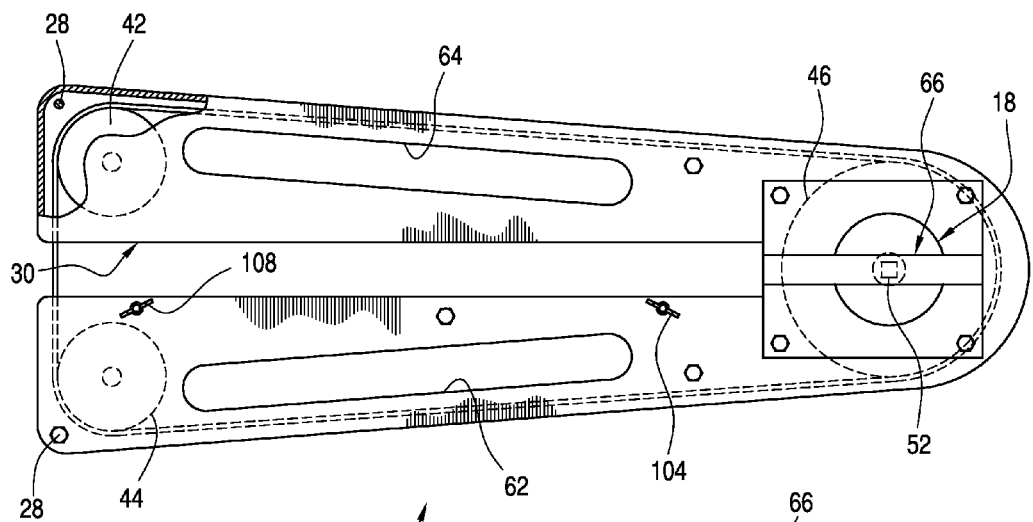
FIG. 3 is a partially broken away top plan view of the preferred embodiment of FIG. 1.

FIGS. 1-3 illustrate a portable power saw 10 according to a preferred embodiment of the invention.

As shown, portable power saw 10 may include a housing 20, and housing 20 may include a top face 22 provided on an upper half 24 of housing 20. A lower half 26 of housing 20 may likewise be provided according to the invention.

It is contemplated that upper half 24 and lower half 26 of housing 20 may be detachably attached together so that they may be readily removed by a user. Conveniently, one or more fasteners 28, such as the illustrated bolts 28, may be provided at various locations so that a user may readily take apart and secure upper and lower housings 24 and 26 together. Further benefits of detachably attached upper and lower housing halves 24 and 26 will be explained in greater detail below.

Portable saw 10 may likewise include a portable power supply 18, such as am electric motor 18 as shown. Power supply 18 may likewise be an internal combustion (IC) engine, which may be a gasoline powered engine for example.

A driven blade 14 having teeth 34 may be provided and powered by motor 18. An opening or throat 30 may be provided in housing 20 so as to expose a portion of blade 14. As will be readily appreciated, exposed portion of blade 14 is the region in which an object to be cut by teeth 34 will be located when the user is cutting. Throat 30 may be long and narrow as shown in particular in FIGS. 1 and 2 so as to accommodate elongated objects and objects from which relatively long portions are to be cut, for example a piece of plywood, conduit, or wood, such as a so-called two-by-four.

In order to drive blade 14, a drive wheel 46 and driven or guide wheels or guide pulleys 42 and 44 may be provided around which blade 14 is guided. Drive wheel 46 may be driven by a shaft 52 of motor 18. In the case of an electric motor, the speed, as well as the direction of rotation of drive wheel 46 may be readily varied or reversed by use of conventional gearing and controls which are not visible in the drawings.

One or more handles, such as a right handle 62, a left handle 64, and an end or rear handle 66 may be provided. Handle 62 and 64, which may be termed side handles 62 and 64, may be defined by removed portions of housing 20 as will be readily understood by a person having ordinary skill in the art. End handle 66 may be termed a rear handle as it is at the end of housing 20 away from throat 30 which is the working end of saw 10. Rear handle 66 may have a partially rectangular construction, as shown, or may be a curved handle, as will be appreciated. End handle 66 and motor 18 may be provided on a base 80 which is detachably attached by one or more fasteners, such as a number of bolts 82, 84, and 86.

Advantages of the detachability of end handle 66 and motor 18 will be explained in greater detail immediately below.

A moved position of handle 66 is designated as moved handle 98 represented by broken lines in FIG. 1. Handle 66 and motor 18 shown on upper face 22 are moved to moved position 98 of the handle when the user prefers having handle 66 on the lower face of saw 10. In order to achieve the moved position 98, the user loosens and removes bolts 82, 84, and 86, removes base 80 along with end handle 66, and moves motor 18 together with them to the opposite face of housing 20. At that time bolts 82, 84, and 86, are reinserted into housing 20, tightened, and moved position 98 has been achieved as will be readily understood.

A depth or width gauge 100 may be provided on saw 10. Depth or width gauge 100 is adjustably displaceable in the direction of double-headed arrow 106 thanks to the provision of one or more fasteners 104, 108, such as the illustrated wing nuts. Throat 30 defined by housing 20 may include a face 110. A distance between face 110 and depth gauge 100 may be termed a depth or width 118 provided between face 110 and a side of depth gauge 100 facing face 110. As will be appreciated, in the case where a user is cutting a piece of material, such as a piece of plywood which has a width smaller than width 118 as shown, the user may loosen wing nuts 104 and 108 to sufficiently release the engagement between gauge 100 and the remainder of saw 10 so that gauge 100 may be moved toward face 110. When the desired width is reached, such as a width substantially the same as the piece of material to be cut, then the user may fix gauge 100 in place by turning wing nuts 104 and 108 in the direction to tighten the engagement between gauge 100 and the remainder of saw 10; e.g., the engagement between gauge 100 and housing 20, for example.

Further, a depth or length gauge 130 may be provided for varying the depth or length of cutting region or throat 30. Depth gauge 130 may be provide with a wing nut 134 and a bolt 138, as shown more particularly in FIG. 2, for detachably securing depth gauge 130 to the remainder of portable saw 10, such as to upper face 22, as shown, and to the lower face of housing 20. In the case where a portion of a piece of plywood, for example, is to be cut off the remainder of the piece of plywood, the user may release the engagement between depth gauge 130 and housing 20 by loosening wing nut 134 relative to bolt 138 having a bolt head 142 so that depth gauge 130 may be moved back and forth in the direction of a double-headed arrow 190, as shown.

Conveniently, distance indicators, such as English measurements 132 or metric measurements 133 may be provided. Thus, if a user wanted to cut off a two inch piece of plywood, the user could release the engagement between depth gauge 130, and then slide depth gauge 130 toward a front end 160 of saw 10 until the markings 132 corresponding to two inches was reached. Then, the user would secure depth gauge 130 in place and the user would know that a two inch piece could be cut off by engaging a free end of the object to be cut and then actuating motor 18 for rotating blade 14 and pushing rotating blade 14 against the piece of plywood being cut for cutting off a two inch portion of the plywood without further measurement, as will be readily understood.

An end opposite front end 160 of saw 10 may be termed a rear or motor end 170 of housing 20. Rear end 170 is substantially at the opposite end of saw 10 from working or front end 160.

Figure 4:
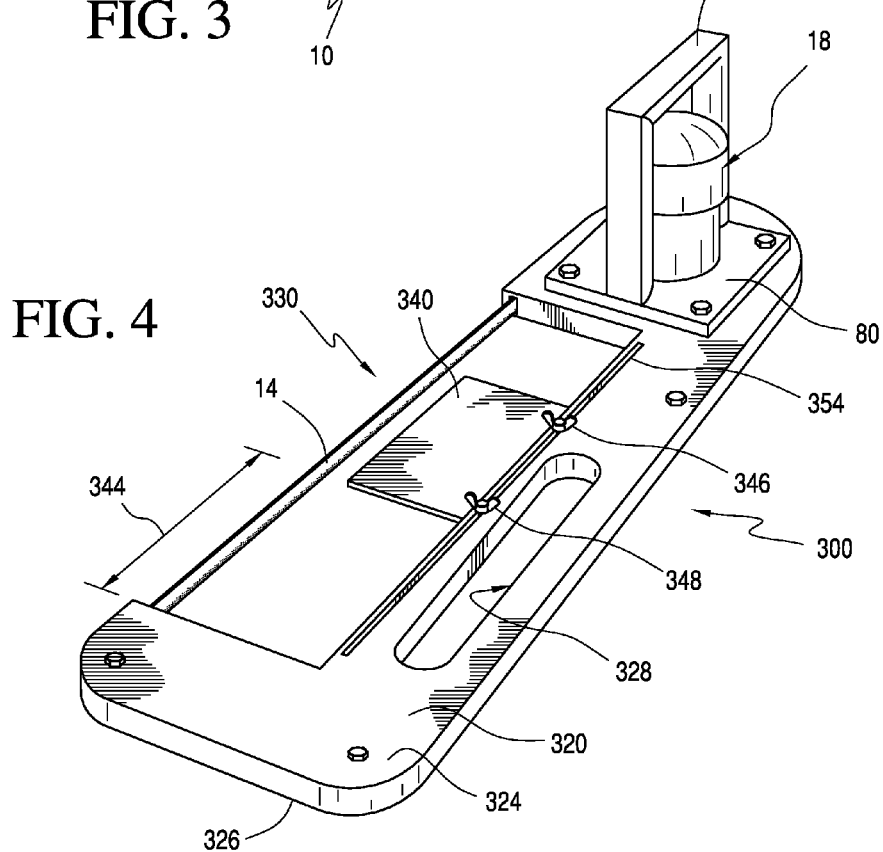
FIG. 4 is a top perspective view of a further preferred embodiment of the portable saw according to the invention.

FIG. 4 illustrates a further preferred embodiment of a saw 300 according to the invention.

Saw 300 may be provided in that form from the manufacturer; that is, with a housing 320 having a top half 324 and a bottom half 326 of housing 320. Housing 320 is configured for providing a throat or mouth 330 which governs the width and depth or width and length of a portion of an object to be cut by blade 14 of saw 300 in use. Although the drawings are not to scale, it will be readily seen that mouth 330 is adjacent to motor 18 and handle 66 in this embodiment, as opposed to the location of throat 30 of the preferred embodiment of FIGS. 1-3. Even though the illustrated Figs. are not to scale, in the case where housing 320 of saw 300 has substantially the same length (i.e. substantially the same distance between front end 160 and rear end 170 of saw 10 of FIG. 1 and substantially the same length of the respective distances on saw 300 of the FIG. 4 embodiment, it will be appreciated that mouth 330 may be sized and configured for cutting up larger portions of an object to be cut when saw 300 is used.

As shown, it is contemplated that the user may remove housing 20, that is, upper half 24 of housing 20 by removing each of bolts 28, setting aside upper housing 24, and then removing the upper half 324 of housing 320. Idler wheels 42, 44, and drive wheel 46, as well as blade 14 are then moved from housing 20 to housing 320, upper half 324 is put in place on lower housing 326, and reattached using bolts 28. In that manner, the user has completely changed the configuration of the portable saw according to the invention. That is, the user has readily converted saw 10 having left and right handles 62 and 64 and end handle 66, respectively, to saw 300 of the embodiment of FIG. 4 having a left handle 328 and an end handle 66, as well as throat 330 with a different configuration from throat 30 of the preferred embodiment of FIG. 1. As the housing 20 is detachably attached, and replaceable with further housing 320, such may be termed a portable saw kit.

It must be emphasized that applicant has provided that drive wheel 46 and guide or idler wheels 42 and 44 along with blade 14 are designed to fit exactly within housing 320. In that manner, an object of the invention to provide a portable power saw which is readily converted for different users, different uses, left handed users, right handed users, and the like has been achieved.

A width gauge 340 may be provided on saw 300. Width gauge 340 may be adjustably attached to housing 320 by provision of releasably attached fasteners or other securing elements, such as one or more wing nuts 346, 348. Conveniently, a slot 354 may be provided in housing 320 along which releasable securing elements 346 and 348 may slide when released from engagement. In that manner, width gauge 340 may be moved toward and away from handle 66 for adjusting a width 344 of throat 330, as will be readily appreciated. As shown in FIG. 4, width 344 may be set so that an object to be cut may be cut at a width 344 as governed by the width gauge 340, as will be readily understood.

Figure 5:
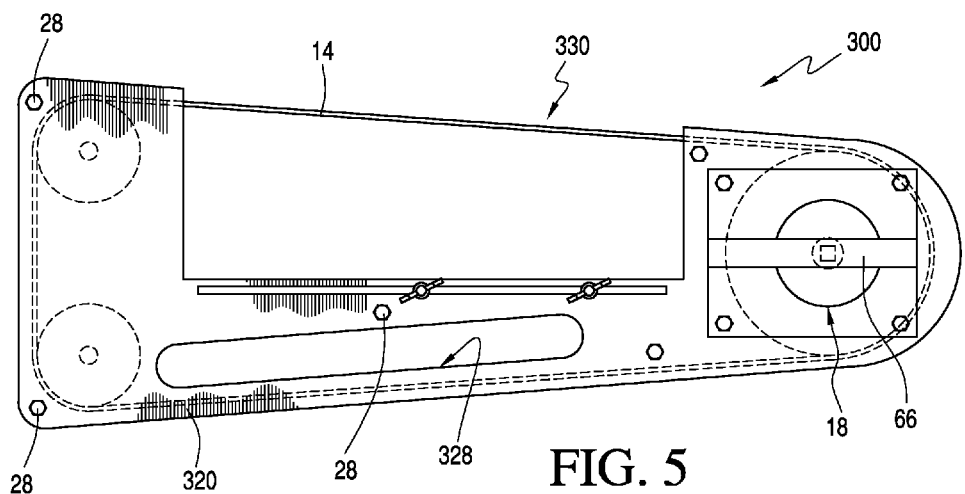
FIG. 5 is a top plan view of the embodiment of FIG. 4.

FIG. 5 is a top plan view of saw 300 of FIG. 4 in which width gauge 340 has been removed for clarity and for use when no width gauge is desired or required.

Figure 6:
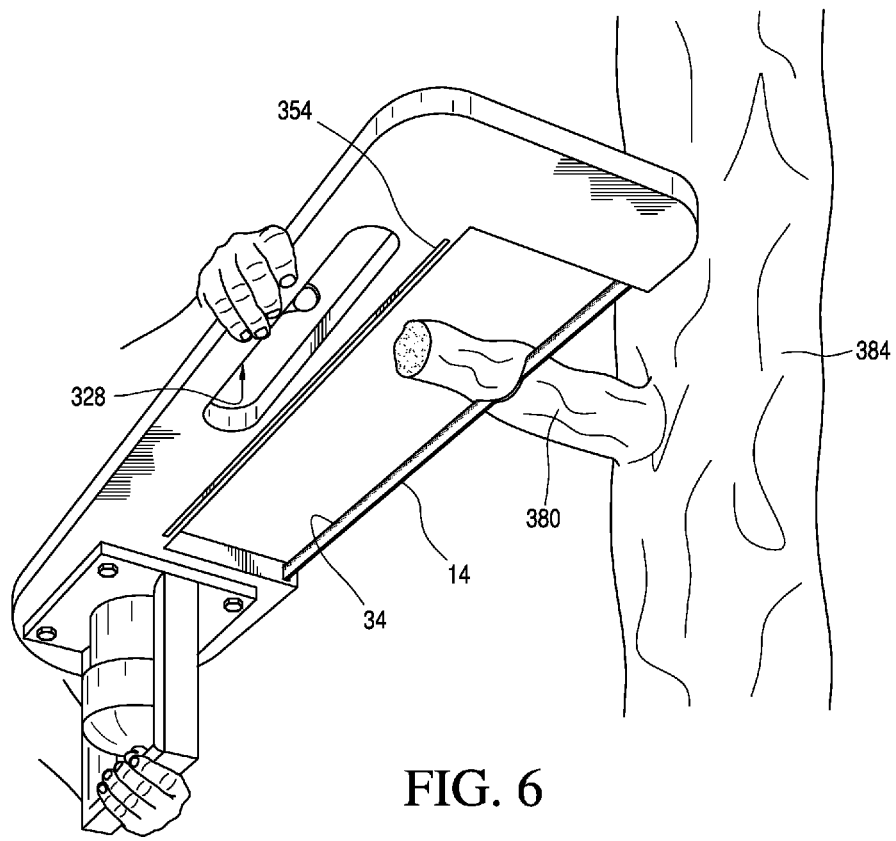
FIG. 6 is a perspective view of the further preferred embodiment of FIG. 4 according to the invention, in use cutting a branch of a tree.

For example, as shown in FIG. 6, no width gauge 340 is required when portable saw 300 is in use in the field, such as for cutting a branch 380 on a tree 384.

As shown, the user, whose hands are schematically illustrated, has actuated motor 18 and is driving blade 14 so that teeth 34 are cutting into branch 380. The user is shown undercutting branch 380 by pulling saw 330 toward himself or herself. This is a conventional way to cut off a branch by first cutting into branch 380 from below so that after a portion of branch 380 has been cut on a lower face thereof, the user then moves saw 300 and cuts branch 380 from above. Depending on the user preference, or the situation, the user can either turn off motor 18 to stop blade 14 from moving, and then rotate the saw and move to a different position for cutting the remainder of branch 380 from the side or from above. If desired, the user could stop the saw, and then detach motor 18 and handle 66 from housing 330, as described above in connection with the embodiment of FIGS. 1-3 and then secure base 80, motor 18, and handle 66 on bottom half 326 of housing 320. Then, the user could turn on motor 18, and then pull saw 330 toward himself and cut the branch 380 from the side or above.

It is contemplated that the electric motor may be a 110V/220V motor, with or without a rechargeable battery, or a gasoline or diesel engine. The electric motor may likewise be a rechargeable 18V or 24V motor. The throat width may have any desired size, and may be provided in various sizes such as 2 inch, 3 inch, 6 inch, 12.5 inch, and/or 17 inch, for example.

It is contemplated that the housing may be made of metal, or of various plastic materials such as polyethylene, composite materials, and other fiber glass reinforced plastics (FRPs).

It is further contemplated that one or more of the driven and tensioning or guide wheels may be made of metal, or preferably may be made of synthetic materials to reduce weight. The wheels may likewise be made of one or more composite materials. The handle adjacent the motor may likewise be made of synthetic materials, including composite materials.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A portable saw kit with a housing and an interchangeable further housing, the portable saw kit comprising:
    a) the housing including a top housing and a bottom housing, and the bottom housing is detachably attached to the top housing, the housing having a first face and a second face;
    b) a continuous saw blade provided substantially inside the housing;
    c) a throat provided in the housing, the throat being configured and sized for exposing a portion of the continuous saw blade so that the saw blade can contact and cut an object brought into contact with the saw blade;
    d) a power unit provided on the first face of housing, the power unit being detachably attached to the first face, and the power unit including a drive for driving the continuous saw blade in a first direction for cutting an object brought into contact with the continuous saw blade;
    e) a first guide and a second guide provided for guiding the continuous saw blade, and the second guide being provided spaced apart from the first guide;
    f) a side handle provided on the housing at a distance from the power unit, and the side handle being configured for being held by a user at a desired angle;
    g) an end handle being provided on the first face of the housing adjacent the power unit, the end handle being detachably attached to the housing;
    h) the housing, the continuous saw blade, the power unit, and the side handle being sized and configured for cutting an object brought into contact with the continuous saw blade;
    i) the further housing having a side handle provided on the further housing on a left side at a distance from the power unit, and the further housing having a further throat provided on the further housing, the further throat having a different configuration than the configuration of the throat provided on the housing.

2. The portable saw kit according to claim 1, wherein:
    a) the drive, the first guide, the second guide, and the continuous saw blade are configured to remain in place relative to each other when the top housing is removed.

3. The portable saw kit according to claim 1, wherein:
a) the further throat is provided on the right side of the further housing.

4. The portable saw kit according to claim 3, wherein:
a) the throat provided in the housing is provided between the first guide and the drive.

5. The portable saw kit according to claim 1, wherein:
a) the first guide, the second guide, and the drive are spaced apart from each other and define a triangle, and a first distance between the first guide and the second guide differ from a second distance between the first guide and the drive.

6. The portable saw kit according to claim 5, wherein:
a) the throat provided in the housing is provided between the first guide and the second guide.

7. The portable saw kit according to claim 1, wherein:
a) the power unit is an electric motor.

8. The portable saw kit according to claim 1, wherein:
a) the power unit is an internal combustion engine.

9. The portable saw kit according to claim 1, wherein:
a) the throat provided in the housing is provided on a side of the housing.

\* \* \* \* \*